July 14, 1931.  E. D. RAPP  1,814,740
CANDY COOLER
Filed May 24, 1930

Inventor,
Emmanuel D. Rapp,
By Hanks Ingleman,
Attorney.

Patented July 14, 1931

1,814,740

UNITED STATES PATENT OFFICE

EMMANUEL D. RAPP, OF MORAN, KANSAS

CANDY COOLER

Application filed May 24, 1930. Serial No. 455,315.

This invention relates to a stand for holding candy and other articles in an ice cream cabinet from which they can be expeditiously removed for quick service and distribution.

It is an object of this invention to provide a holder of this character which is in the nature of a stand having a plurality of trays whose bottoms are preferably perforated in order to permit circulation of cold air and effect complete refrigeration of the contents of the trays or shelves.

It is also an object of the inventor to provide certain of the trays with relatively large holes which will serve to hold ice cream cones which may be filled and placed in an ice cream cabinet ready for sale.

It is furthermore an object of this invention to provide a plurality of trays with means for holding them in superimposed relation to one another in order that they may be handled as a unit when placed in or removed from an ice cream cabinet and, to that end, the column or some part of the stand is provided at the top with a handle which may be grasped in moving the stand, as indicated.

It is a still further object of this invention to provide a stand of the character noted which is comparatively inexpensive to produce and which will prove efficient and satisfactory in use.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

In these drawings, 5 denotes a suitable base from which a standard or column 6 extends upwardly a suitable distance according to the number of trays 7 to be incorporated in the structure and the distance that they shall be separated one from the other. A handle 8 is supplied at the top of the stand and it may be secured to the structure in any appropriate way, the purpose being that it may be grasped for manipulating the stand in applying it to an ice cream cabinet or in removing it therefrom, or in otherwise handling it.

Figure 1:
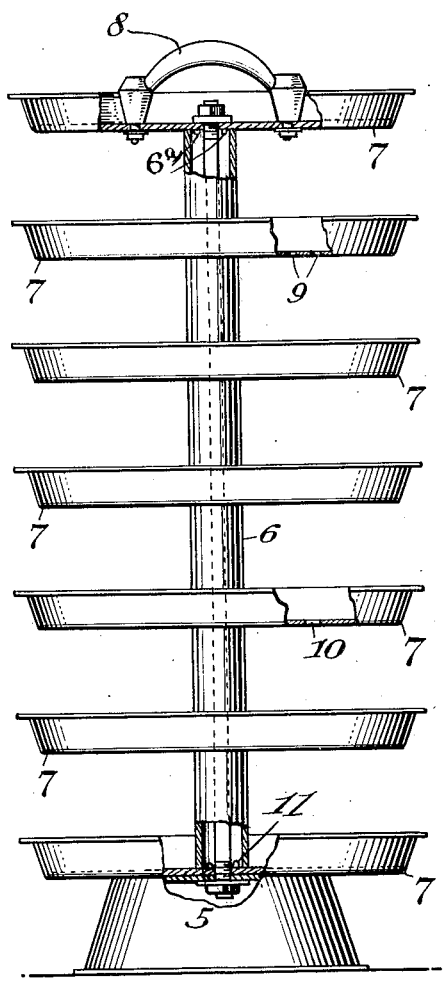
Figure 1 illustrates a view in elevation of a stand embodying the invention.
Figure 2:
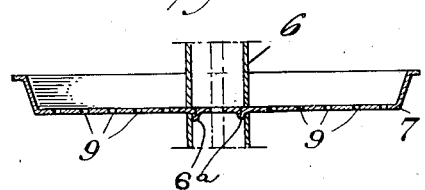
Figure 2 illustrates a sectional view of one of the trays having the small perforations.
Figure 3:
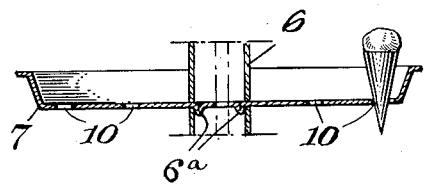
Figure 3 illustrates a sectional view of a tray having perforations intended to receive ice cream cones.
Figure 4:
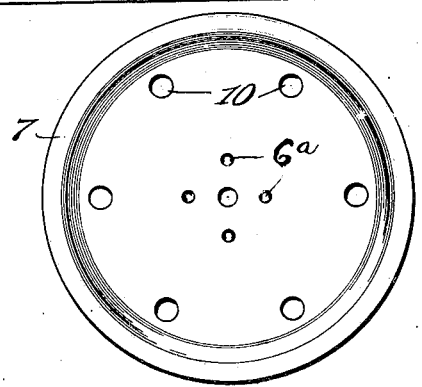
Figure 4 is a plan view of one of the trays.

The trays may be provided with a plurality of small apertures or perforations 9 or, as illustrated in Fig. 3, one or more trays may be provided with relatively large apertures 10, for the reception of filled ice cream cones, as stated.

Each column section 6 is held centered by projections $6^a$ formed on the trays, engaging the inner surfaces of the column sections.

It is the purpose of the inventor that the trays shall generally be used for holding candy which may be kept cold by placing the stand in an ice cream cabinet or ice box and the stand may be lifted in order that access may be had to the lower trays if, for instance, the said stand is stored in an ice box. Where ice cream cabinets are used and the stand is applied to one of them, the goods on practically all of the trays will be accessible, more so, at least, than when the stand is placed in an ice box.

I claim:

1. In a stand of the character indicated, a base, sectional columns supported thereon, trays in superimposed relation to each other on the sections of the columns, the bottoms of said trays having lugs projecting therefrom into the said sections for engaging the walls thereof for holding the parts in assembled relation to one another, and means extending through the column sections for binding the trays and columns together.

2. In a stand of the character indicated, a base, sectional columns supported thereon, trays in superimposed relation to each other on the sections of the columns, the said trays having apertures in their bottoms for receiving parts of ice cream cones, the bottoms of said trays having lugs projecting therefrom into the said sections for engaging the walls thereof for holding the parts in assembled relation to one another, and means extending through the column sections for binding the trays and columns together.

EMMANUEL D. RAPP.